United States Patent
Frost et al.

(10) Patent No.: US 9,462,043 B2
(45) Date of Patent: Oct. 4, 2016

(54) FRAMEWORK FOR DYNAMICALLY PROGRAMMED NETWORK PACKET PROCESSING

(71) Applicant: Cisco Technology, Inc., San Jose, CA (US)

(72) Inventors: Daniel C. Frost, Middlesex (GB); Stewart F. Bryant, Merstham (GB); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 426 days.

(21) Appl. No.: 13/927,394

(22) Filed: Jun. 26, 2013

(65) Prior Publication Data

US 2014/0280717 A1    Sep. 18, 2014

Related U.S. Application Data

(60) Provisional application No. 61/779,823, filed on Mar. 13, 2013.

(51) Int. Cl.
| | | |
|---|---|---|
| *G06F 15/173* | (2006.01) | |
| *G06F 15/177* | (2006.01) | |
| *H04L 29/08* | (2006.01) | |
| *H04L 12/721* | (2013.01) | |
| *G06F 15/16* | (2006.01) | |
| *H04L 29/06* | (2006.01) | |

(52) U.S. Cl.
CPC ............. *H04L 67/10* (2013.01); *H04L 45/566* (2013.01); *H04L 63/0428* (2013.01); *H04L 2463/041* (2013.01)

(58) Field of Classification Search
CPC . H04L 67/10; H04L 45/566; H04L 63/0428; H04L 2463/041
USPC ........................................................ 709/217
See application file for complete search history.

(56) References Cited

U.S. PATENT DOCUMENTS

| | | | |
|---|---|---|---|
| 5,195,181 A | 3/1993 | Bryant et al. | |
| 5,353,283 A | 10/1994 | Tsuchiya | |
| 5,426,639 A * | 6/1995 | Follett ..................... | G06F 5/065 370/412 |
| 6,631,484 B1 * | 10/2003 | Born ..................... | G06F 13/405 370/395.1 |
| 6,650,640 B1 * | 11/2003 | Muller ..................... | H04L 49/90 370/392 |
| 6,675,218 B1 * | 1/2004 | Mahler ................... | H04L 29/06 370/229 |
| 6,990,108 B2 * | 1/2006 | Karlsson ............ | H04Q 11/0478 370/395.1 |
| 6,996,126 B2 * | 2/2006 | Deml .................... | H04L 49/309 370/392 |
| 7,177,311 B1 * | 2/2007 | Hussain et al. ............... | 370/392 |

(Continued)

OTHER PUBLICATIONS

Chandranmenon, Girish and Varghese, George. "Trading Packet Headers for Packet Processing," SIGCOMM, 1995.*

(Continued)

*Primary Examiner* — Melvin H Pollack
(74) *Attorney, Agent, or Firm* — Edell, Shapiro & Finnan, LLC (57) ABSTRACT

One or more functions to be performed on a packet at one or more network nodes along a network path are determined at a network device. A packet is generated which includes a packet header. Included in the packet header are an instruction pointer and an instruction portion. A first instruction for the one or more functions to be performed at the one or more network nodes is written to the instruction portion. Additionally, a value pointing to the first instruction is written to the instruction pointer. The packet is transmitted along the network path from the network device.

21 Claims, 7 Drawing Sheets

(56) References Cited

U.S. PATENT DOCUMENTS

| | | | | |
|---|---|---|---|---|
| 7,181,742 | B2 * | 2/2007 | Hooper | 718/100 |
| 7,286,566 | B1 * | 10/2007 | Parruck et al. | 370/474 |
| 7,340,535 | B1 * | 3/2008 | Alam | 709/246 |
| 7,366,865 | B2 * | 4/2008 | Lakshmanamurthy | G06F 12/0804 370/412 |
| 7,403,542 | B1 * | 7/2008 | Thompson | 370/474 |
| 7,460,473 | B1 * | 12/2008 | Kodama | H04L 47/10 370/230 |
| 7,529,224 | B2 * | 5/2009 | Basso | H04L 12/5693 370/351 |
| 7,551,632 | B2 | 6/2009 | Thubert et al. | |
| 7,673,072 | B2 * | 3/2010 | Boucher | H04L 69/16 370/320 |
| 7,782,834 | B2 | 8/2010 | Chitrapu | |
| 7,835,393 | B2 * | 11/2010 | Ren et al. | 370/466 |
| 8,028,298 | B2 * | 9/2011 | Moore | G06F 9/45537 719/314 |
| 8,065,439 | B1 * | 11/2011 | Johnson | H04L 1/0043 709/217 |
| 8,259,585 | B1 * | 9/2012 | S P et al. | 370/237 |
| 8,631,483 | B2 * | 1/2014 | Soni | H04L 63/0263 370/389 |
| 8,705,533 | B1 * | 4/2014 | Venkatraman et al. | 370/392 |
| 8,762,532 | B2 * | 6/2014 | Kohlenz et al. | 709/226 |
| 8,798,047 | B1 * | 8/2014 | Wadekar et al. | 370/389 |
| 8,813,220 | B2 * | 8/2014 | Knapp et al. | 726/22 |
| 8,825,900 | B1 * | 9/2014 | Gross et al. | 709/238 |
| 8,831,025 | B2 * | 9/2014 | Finney et al. | 370/412 |
| 8,838,705 | B2 * | 9/2014 | Zwaal et al. | 709/206 |
| 8,891,532 | B1 * | 11/2014 | Smith et al. | 370/395.52 |
| 8,982,710 | B2 * | 3/2015 | Meilik et al. | 370/241.1 |
| 9,030,934 | B2 * | 5/2015 | Shah et al. | 370/235 |
| 2001/0052053 | A1 * | 12/2001 | Nemirovsky | G06F 9/546 711/138 |
| 2002/0101868 | A1 | 8/2002 | Clear et al. | |
| 2005/0232303 | A1 * | 10/2005 | Deforche | H04L 49/90 370/469 |
| 2009/0213858 | A1 | 8/2009 | Dolganow et al. | |
| 2012/0120959 | A1 * | 5/2012 | Krause | 370/392 |

OTHER PUBLICATIONS

International Search Report and Written Opinion in counterpart International Application No. PCT/US2014/018206, mailed May 26, 2014, 9 pages.
Wang et al., "Research and Implementation of a Scalable Secure Active Network Node", Proceedings of the First International Conference on Machine Learning and Cybernetics, IEEE, Nov. 2002, pp. 111-115.
Dragos Niculescu, "Survey of Active Network Research", Retrieved on Jul. 22, 2004, Jul. 1999, pp. 1-13.
Wetherall et al., "The Active IP Option", Proceedings of the 7th Workshop of ACM Sigops. Systems Support for Worldwide Applications, Sep. 1996, pp. 33-40.

* cited by examiner

FRAMEWORK FOR DYNAMICALLY PROGRAMMED NETWORK PACKET PROCESSING

PRIORITY CLAIM

This application claims the benefit of Provisional Application No. 61/779,823, filed Mar. 13, 2013, the contents of which are hereby incorporated by reference.

TECHNICAL FIELD

The present disclosure relates to network traffic, and in particular dynamically programmed network packets.

BACKGROUND

Packet networks today operate according to a model in which the processing operations that take place on a given packet within a network are implicit, based on a fixed-format packet header and a series of fixed programs that exist inside each of the network devices along the packet's path. That is, a packet header is merely a data object with a well-known format that is operated on by programs within devices designed to handle such objects, such as routers, switches, firewalls, load-balancers, and others. The "actions" or functions of packet processing are often performed by monolithic, proprietary black-box hardware/software programs, and the packets themselves serve merely as passive inputs to these routines.

As the number of desired packet processing functions grows, as network operators increasingly seek consolidation and simplification to avoid maintaining large numbers of different makes and models of network appliances, and as ever larger parts of the network are "virtualized," it becomes important to have a more powerful, general, and expressive approach for describing the sequence of processing operations that should be performed on a packet as it travels through a network from ingress to egress.

DESCRIPTION OF EXAMPLE EMBODIMENTS

Overview

One or more functions to be performed on a packet at one or more network nodes along a network path are determined at a network device. A packet is generated which includes a packet header. Included in the packet header are an instruction pointer and an instruction portion. A first instruction for the one or more functions to be performed at the one or more network nodes is written to the instruction portion. Additionally, a value pointing to the first instruction is written to the instruction pointer. The packet is transmitted along the network path from the network device.

EXAMPLE EMBODIMENTS

Figure 1:
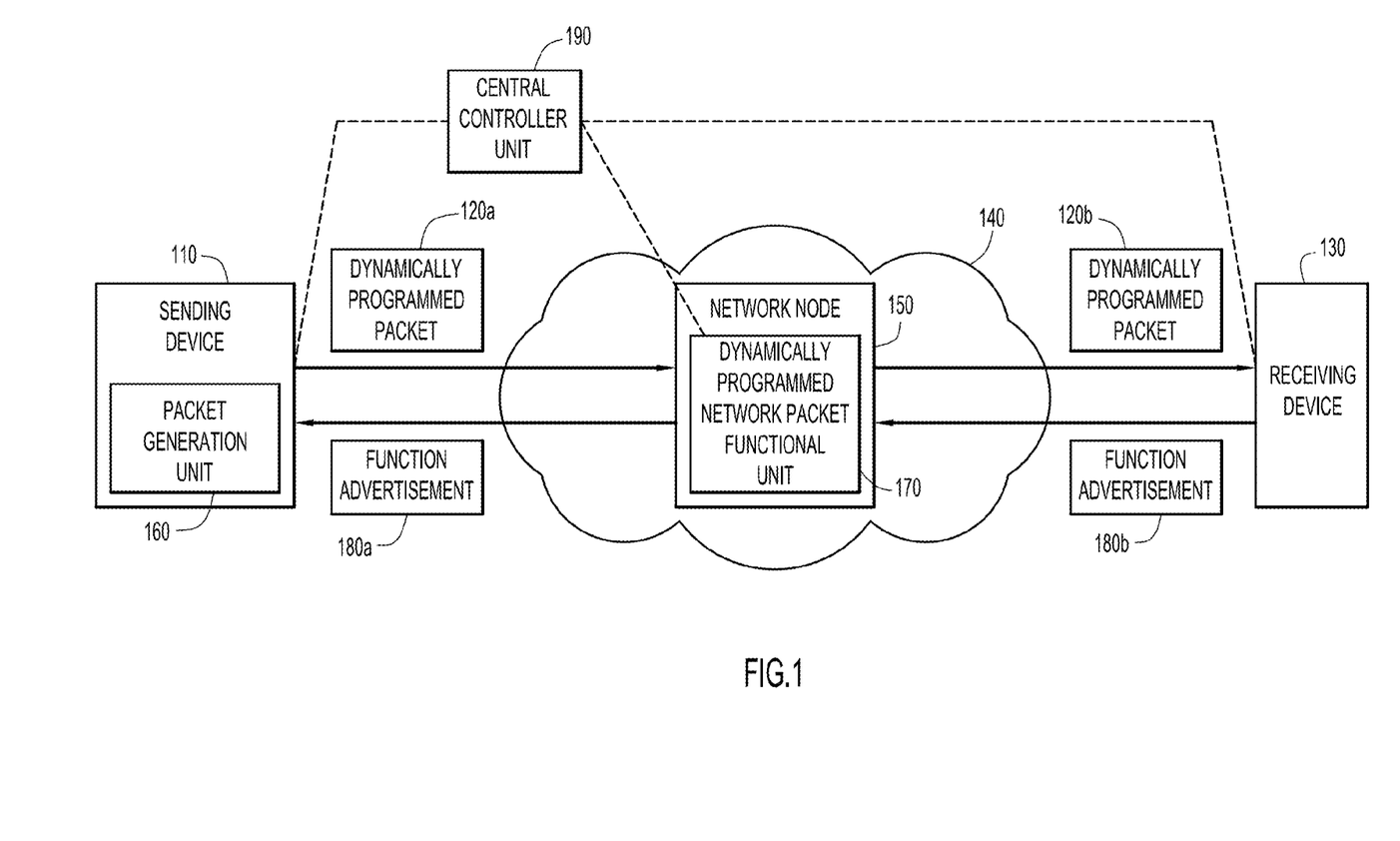
FIG. 1 is an illustration of a network environment configured to perform dynamically programmed network packet processing.

Depicted in FIG. 1 is an environment implementing dynamically programmed packet processing. Specifically, a sending device 110 generates dynamically programmed packet 120a for transmission to receiving device 130 through network 140. Dynamically programmed packet 120a is generated so that a network node 150 may perform predetermined functions on the packet. For example, sending device 110 may indicate that network node 150 should perform some type of processing, such as encryption, on the payload of dynamically programmed packet 120a. Accordingly, sending device 110, through packet generation unit 160, creates dynamically programmed packet 120a with a header that includes an instruction portion which can be read and implemented by dynamically programmed packet functional unit 170 of network node 150.

By generating packets with a dynamically programmed instruction portion, a packet 120a may be created which contains the complete sequence of the processing steps that the nodes of network 140 are to perform on the packet 120a.

Figure 2:
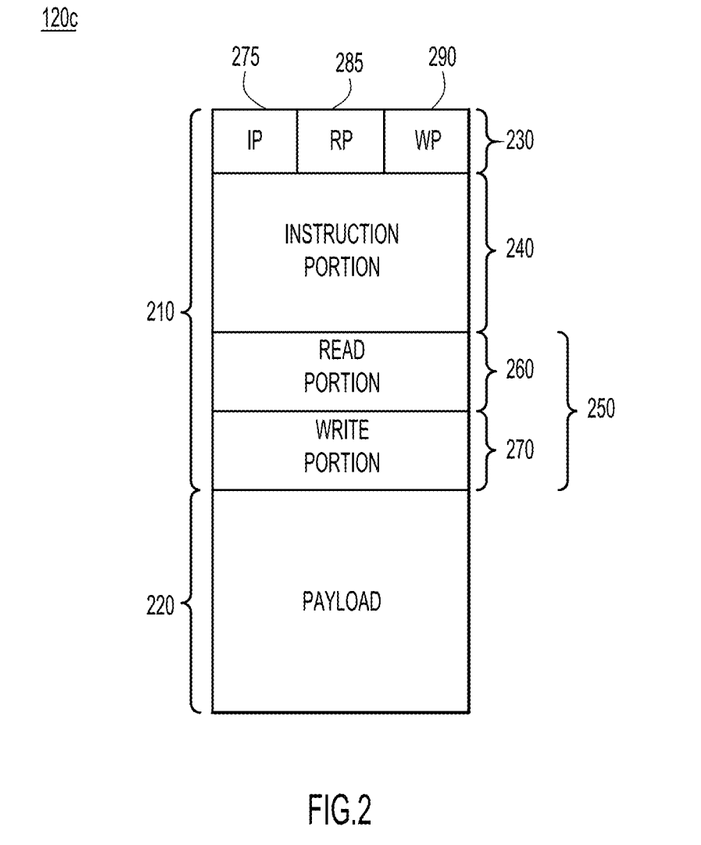
FIG. 2 is an illustration of a first example of a dynamically programmed network packet.

Turning briefly to FIG. 2, depicted therein is an example packet 120c including dynamically programmed packet header 210 and payload 220. Included in header 210 are control portion 230, instruction portion 240, and scratch portion 250. The scratch portion of FIG. 2 is divided into read portion 260 and write portion 270.

The header portion 210 may replace or augment the traditional fixed-format packet header with a program block, or instruction sequence contained within instructions portion 240, that specifies how the network device should process the packet. In practice the packet structure of packet 120c may encapsulate another packet type. For example, the packet header as described herein may frame a packet arranged according to another protocol, such as an internet protocol packet. In addition, examples of dynamically programmed packets may include additional portions, such as packet source and destination fields, as well as other fields known to those skilled in the art.

In traditional networks, the packet self-identifies as an instance of a particular kind of data object, and is processed by the receiver according to an implicit set of rules. Packet 120, in contrast, may not self-identify as an instance of a class of data objects, but may rather explicitly list the instructions that should be used by the receiver to process it according to the content of instruction portion 240.

Specifically, instruction portion 240 is configured to contain instructions that can be performed at network nodes, such as network node 150 of FIG. 1. For example, the instructions may instruct a network node to perform an encryption process on packet payload 220 using an encryption key written to read portion 260 of scratch portion 250. Instruction portion 240 may also include instructions that allow a network node to participate in network diagnostics, such as instructing the node to write a timestamp to write portion 270 of scratch portion 250. Other instructions may direct or "tunnel" the packet through the network by explicitly defining each node and/or link in the network path to be taken by the packet.

Conceptually, the instructions in instruction portion 240 may be similar to subroutine calls. Accordingly, a receiving device, upon receiving the packet, processes the instructions in the instruction portion in sequence. Processing at the receiving device stops when a "terminal" instruction is encountered, i.e., an instruction that results in the packet being forwarded to another network element or an instruction removing the packet from the routing domain.

The set of possible instructions that can appear in instruction portion 240 depends on the capabilities supported by the network devices traversed by packet 120. Examples of instructions include "output" instructions that direct a network device to forward the packet via a specific interface or adjacency; "delivery" instructions that direct the network device to remove the packet from the routing domain and deliver it to a specific service process supported by the network device; "timestamp" instructions that direct the network device to write a timestamp into write portion 270; "source authenticate" instructions that direct the network device to validate a cryptographic signature before proceeding; "mirror" instructions that direct the network device to write a copy of the packet to a specific port for offline capture/analysis; "count" instructions that direct the network device to increment a series of counters; "filter" instructions that direct the network device to compare certain data in the instructions portion 240 or the read portion 260 against a specific table of firewall rules; as well as others. For example, the instructions in instruction portion 240 may include instructions which direct a network device to perform deep inspection of the packet payload which allows tracking of specific network traffic, modification of the packet or payload, or even deletion of the packet. Specifically, if the deep inspection of the packet results in a determination that the packet include malicious or otherwise undesirable content, the entire packet may be deleted.

Scratch portion 250 may include a bitfield of a specific length that is used to contain input parameters to, or return values from, the operations indicated in the instruction portion 240. For example, input parameters for the operations indicated by the instructions may be recorded in read portion 260 while return values for the operations may be recorded in write portion 270.

In order to facilitate the execution of the instructions written to instruction portion 240, control portion 230 may be generated with pointer values such as instruction pointer 275, read pointer 285, and write pointer 290. For example, if multiple instructions are written to instruction portion 240, instruction pointer 275 may contain a value that indicates the specific instruction within instruction portion 240 that is to be executed by a particular network node. The instructions within instruction portion 240 may also include instructions to re-set instruction pointer 275 to point to the next instruction to be carried out by the same or another network node.

Similarly, read pointer 285 may point to a location within the read portion 260 of scratch portion 250 where data necessary to carry out a specific instruction is located. Write pointer 290, on the other hand, may point to a location within write portion 270 of scratch portion 250 where a network node should record an output from a particular function carried out in accordance with a particular instruction from instruction portion 240. As with the instruction pointer 275, the instructions contained in instruction portion 240 may include instructions to re-set read pointer 285 and write pointer 290 to correctly point to portions of read portion 260 and write portion 270 to carry out subsequent instructions.

With reference again made to FIG. 1, once packet 120a is generated by sending device 110, it may be received by network node 150. Upon receipt at network node 150, the instructions included in dynamically programmed packet 120a are processed as described above in reference to FIG. 2, and as further described below in greater detail with reference to FIG. 6. In order to process dynamically programmed packet 120a, network node 150 includes dynamically programmed network packet functional unit 170. Functional unit 170 contains logic which allows network node 150 to read and perform operations on dynamically programmed packet 120a in accordance with the instructions included in the packet. In response to the operations carried out by network node 150, the content of packet 120a may be modified, to form modified dynamically programmed packet 120b. Once network node 150 has completed its processing, packet 120b will be forwarded to either another network node, or onto an egress node, such as receiving device 130.

To be able to appropriately dynamically program a packet, a sending device 110 may need to know the functions and operations that can be performed in the nodes, such as network node 150 of network 140. Accordingly, network node 150 may advertise the functions it is able to perform through function advertisements 180a-b. According to FIG. 1, network node 150 performs a multicast advertisement so that every other node connected to network 140 is aware of the functions it is able to perform. According to other examples, network node 150 may unicast its functions to individual nodes. In response to receiving function advertisements 180a-b, an ingress node, such as sending device 110, can define exactly which nodes a packet will traverse while travelling through network 140, and explicitly define operations which are to be performed at each node. According to other example networks, such as Software Defined Networking (SDN) networks, the function advertisement processes may be carried out by a central controller unit 190. Specifically, each of network devices 110, 130 and 150 will advertise the functions they are capable of performing to central controller unit 190. The central controller unit may, in turn, advertise the available function to the rest of the devices. According to other examples, central controller unit 190.

Figure 3:
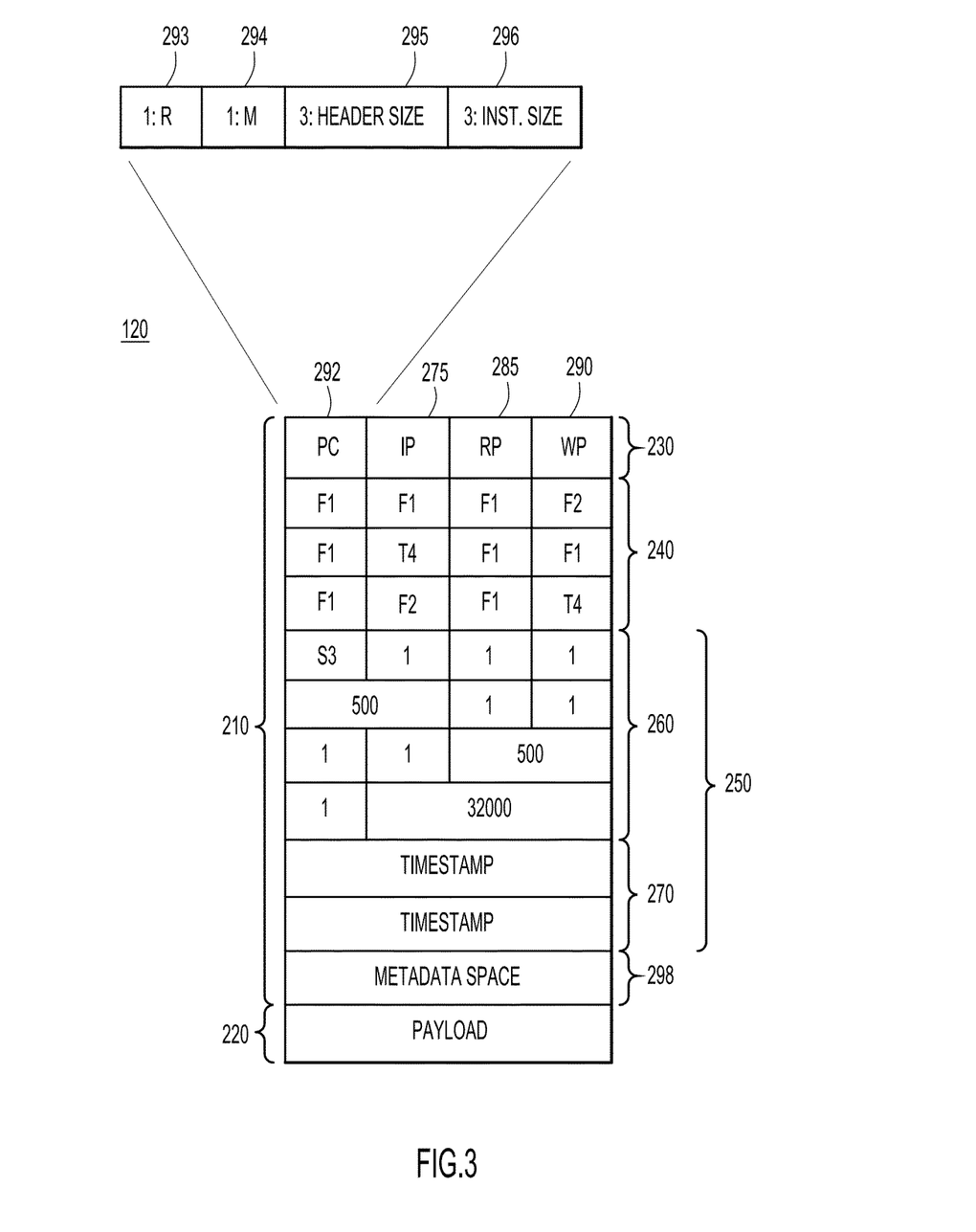
FIG. 3 is an illustration of a second example of a dynamically programmed network packet.

With reference now made to FIG. 3, depicted therein is a detailed view of another example of a dynamically programmed packet 120d configured according to the techniques taught herein. Portions of the packet 120d of FIG. 3 which are also common to the packet 120c of FIG. 2 have been labeled with like reference numbers. New for FIG. 3 are packet class portion 292 and metadata portion 298.

The packet class portion 292 comprises a first flag 293 which may be a field reserved for future use, a metadata flag 294 indicating the presence of metadata portion 298, a header size portion 295 and an instruction size portion 296. Because packet 120d is dynamically generated, the header portion 210 may not have a fixed size common to every packet. Accordingly, the header size portion 295 and instruction size portion 296 serve as an indication to a network device of the size of header 210. Similarly, metadata flag 294 may be replaced by a data field which defines the size of metadata portion 298. Metadata portion 298 is configured to store data that may be utilized by a plurality of the instructions in instruction portion 240. For example, two different instructions may share a common first input, but a different second input. Accordingly, the first input may be stored once in metadata portion 298 while the second inputs may be stored separately in read portion 260 and read according to the current value of read pointer 285.

Instructions portion 240 is divided into ten separate instructions. For example, the first instruction in instruction portion 240, indicated by the first "F1", will be the instruction read by a network node when the instruction pointer 275 value is "1." Specifically, the instruction "F1" is a forwarding instruction that is one byte long, hence the "F1" designation. Accordingly, a one byte instruction, such as "F1," may be used when a network devices has 256 or fewer ports. For example, the contents of the forwarding instruction may tell the network device to transmit the packet from its first port. On the other hand, the fourth instructions, with the designation "F2," may be processed by a network device having up to 65,536 ports, requiring a two-byte forwarding instruction.

The sixth instruction, on the other hand, having a value of "T4" may be an indication that the network node should add a 4-byte time stamp to the packet. Accordingly, the network node that receives the packet with an instruction pointer 275 value of "6" will provide a timestamp, and record the timestamp in the portion of the buffer space indicated by the current value of the write pointer 290. Other instructions may cause a network node to read from a portion of the scratch portion 250 indicated by the read pointer value when the packet is received by the network device or node.

Figure 4:
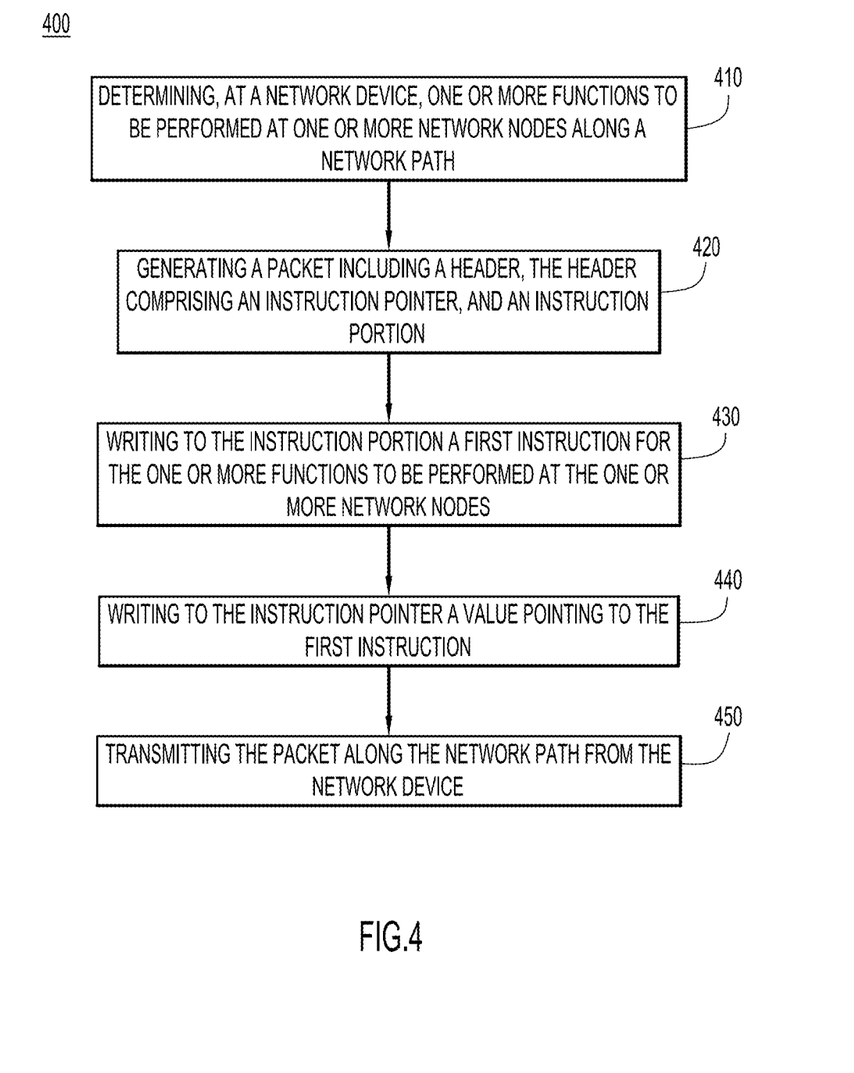
FIG. 4 is a flowchart illustrating a process for generating a dynamically programmed network packet.

With reference now made to FIG. 4, depicted therein is a flowchart 400 illustrating a process for dynamically generating a packet according to the techniques described herein. The process begins in step 410 where a network device determines functions that are to be performed at one or more network nodes along a network path. The selection of the functions may include selecting one or more functions received from function advertisements, such as function advertisements 180a-b of FIG. 1. Similarly, an initial determination may be made at another device, such as central controller unit 190 of FIG. 1. The central controller unit may determine the functions and path for the packet based on received functional advertisements. The functions and path may then be communicated to the network device referred to step 410. The network device of step 410 may then determine the functions and path from the communication so that the packet header may be appropriately generated.

In step 420, a packet, along with a packet header, is generated. The packet header includes an instruction portion and an instruction pointer. Generating the packet header may also include generating a scratch portion. The scratch portion can be configured to include one or more of a read portion and a write portion. If a scratch portion is included in the packet header, pointers to the scratch portion may also be included in the header. For example, if a read portion is included in the scratch portion, a read pointer can also be included as part of the packet header. Similarly, if a write portion is included in the scratch portion, a write pointer may be included in the packet header.

In step 430, a first instruction is written to the instruction portion indicating one or more functions to be performed at the one or more network nodes. Additional instructions may also be written to the instruction portion. Similarly, if a scratch portion has been included in the packet header, if the instruction written in step 430 includes an input value, the input value may be included in a read portion of the scratch portion of the packet header.

In step 440, a value is written to the instruction pointer section which points to the first instruction in the instruction portion. Furthermore, if the packet header includes a read pointer, a value may be written to the read pointer indicating from where in a scratch portion the first read value should be read. Similarly if one of the instructions included in the instructions portion is to write to the scratch portion, a value may be written to the write pointer that indicates where the first value should be written.

Finally, in step 450, the packet is transmitted along the network path to be processed in accordance with the instructions written to its instruction portion in step 430.

Figure 5:
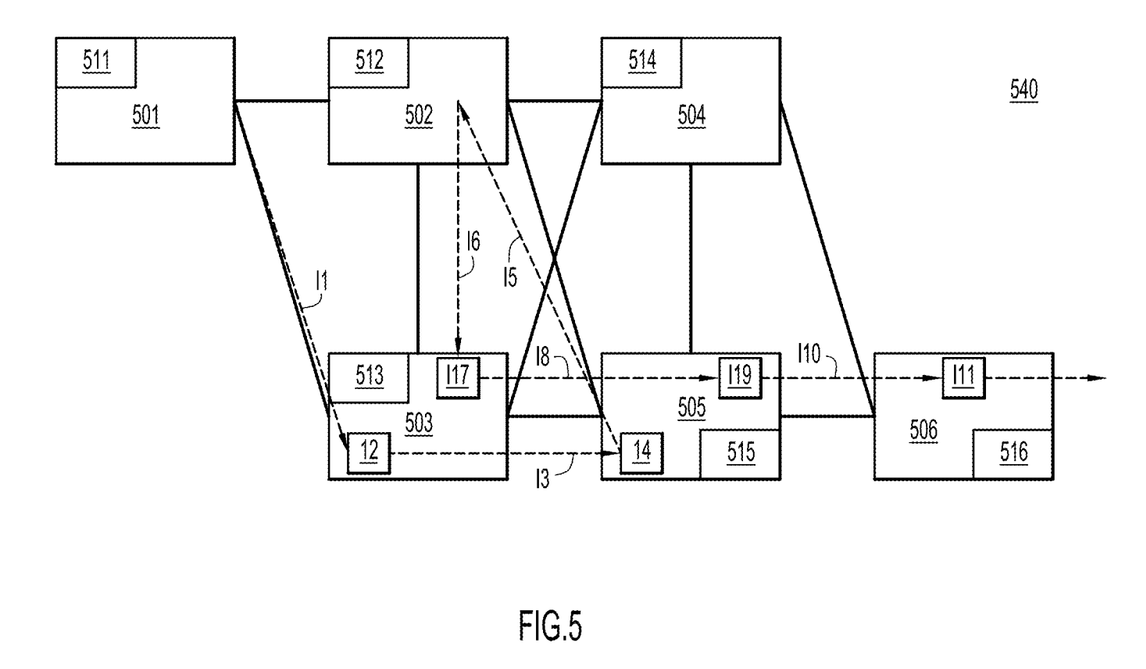
FIG. 5 is an illustration of the processing performed on a dynamically programmed network packet according to the techniques described herein.

With reference now made to FIG. 5, depicted therein is a network 540 including a plurality of network nodes 501-506 which include dynamically programmed network packet functional units 511-516. Dynamically programmed network packet functional units 511-516 are configured to create headers as described herein, read packets and headers as described herein, execute instructions as described herein, read scratch portions and metadata portions as described herein, and write to the scratch portions as described herein. While each of network nodes 501-506 of network 540 are configured to perform the execution of instructions, reading and writing described herein, other example networks may have a combination of network devices configured to process dynamically programmed network packets, as well as network devices configured to process fixed packet headers according to fixed programs.

Network nodes 501-506 may advertise the functions that they are capable of performing. For example, node 503 may be configured to encrypt/decrypt the data payload of a packet, while node 505 may be configured to provide a timestamp to a received packet. Due to this advertising, ingress node 501 will be able to determine or select a path through the network such that the packet will have all the desired functions performed on it.

The functions each network node 501-506 are able to perform may be encoded in machine readable code, that when executed by a processor, cause the process to perform the specific functions defined by the code. Accordingly, each of the dynamically programmed network packet functional units 511-516 may comprise a memory containing instructions, and a processor configured to execute the instructions.

According to one specific example, it may be determined that a packet entering the network 540 through ingress node 501 should be encrypted, receive a timestamp, travel between two additional nodes to test network performance, have its payload decrypted, receive another time stamp, and then exit network through egress node 506. Accordingly, ingress node 501 would build a packet header, such as the packet header of FIG. 3, in which the first instruction "I1" indicates that the packet should exit node 501 at the port that takes it to node 503 and also increment the instruction pointer by one. The second instruction "I2" would indicate that the packet should be encrypted, indicate that the read pointer points to the encryption key located in a particular point in the packet header, and that the instruction pointer and the read pointer should be incremented. The third instruction "I3" would indicate that the packet should exit node 503 on the port that leads to node 505 and that the instruction pointer should be incremented. The fourth instruction "I4" would indicate that node 505 should provide a timestamp at the location indicated by the write pointer, and that the instruction pointer and the write pointer should be incremented. The fifth instruction "I5" indicates that the packet should leave node 505 on the port leading to node 502 and the instruction pointer should be incremented. The sixth instruction "I6" indicates that the packet should leave node 502 on the port leading to node 503 and the instruction pointer should be incremented. The seventh instruction "I7" would indicate that the packet should be decrypted, that the read pointer indicates the decryption key, and the instruction pointer and read pointer should be incremented. The eighth instruction "I8" would indicate that the packet should exit node 503 on the port that leads to node 505 and that the instruction pointer should be incremented. The ninth instruction "I9" would indicate that a timestamp should be provided, the timestamp should be written to the buffer space in the location indicated by the write pointer, and the instruction pointer and write pointer should be incremented. The tenth instruction "I10" would indicate that the packet should leave node 505 on the port that leads to egress node 506. Finally, the eleventh instruction "I11" will be a terminal instruction removing the packet from the network domain. Accordingly, the packet will follow the path indicated by reference numerals I1-I11, having the appropriate actions performed on it at the appropriate nodes.

According to other examples, specific instructions may be repeated by appropriately incrementing and decrementing the instruction, read and write pointers. For example, in order to test network performance in a particular area of a network, an administrator may construct a packet that will loop between a plurality of nodes in order to accurately determine the performance characteristics of those nodes. Depending on the number of times the packet is to circumvent the desired loop, it may be cumbersome to write instructions for each stop in the looped path. In order to efficiently generate a packet that loops through predefined nodes, a single instruction may be written into the instruction portion of a packet that indicates the packet should loop through predetermined number of nodes, with a value recorded and scratch portion of the packet serving as a counter of the number of loops performed or left to be performed.

According to one specific example, the following pseudo-code may be written to an instruction portion of a packet, and used to loop a packet between two nodes until a predetermined number of loops have been performed.

```
If value(write_pointer) ≤ value(read pointer) {
    If value(write_pointer)%2==0{
        value(write_pointer) = value(write_pointer)+1;
        forward packet to node_1;
    }
    Else {
        value(write_pointer) = value(write_pointer)+1;
        forward packet to node_2;
    }
}
Else {
    instruction_pointer++;
    read_pointer++;
    write_pointer++;
};
```

Specifically, the value of the read pointer will serve as an indication of the number of loops to be performed, and the value of the write pointer serves as a counter for the number of loops actually performed. Accordingly, the code instructs a node to forward a packet to "node_1" when the value of the write pointer is even, and forward the packet to "node_2" when the value of the write pointer is odd, until the value of the write pointer exceeds the value of the read pointer. Because the instruction pointer, read pointer and write pointer are not incremented when the packet is forwarded, the instructions will be repeated at the next node to receive the packet. Once the value of the write pointer is greater than the value of the read pointer, the instruction pointer, read pointer and write pointer are all incremented to move the packet out of the looping procedure and into the next instruction in the instruction portion.

As seen in the pseudo-code example above, the instructions in the instruction portion may be implemented in the form of any set of compute operations executable on a general purpose computer of almost any type. For example, the instructions in the instruction portion may be executed on a Von Neumann machine, a Harvard machine, and/or a Turing machine.

Figure 6:
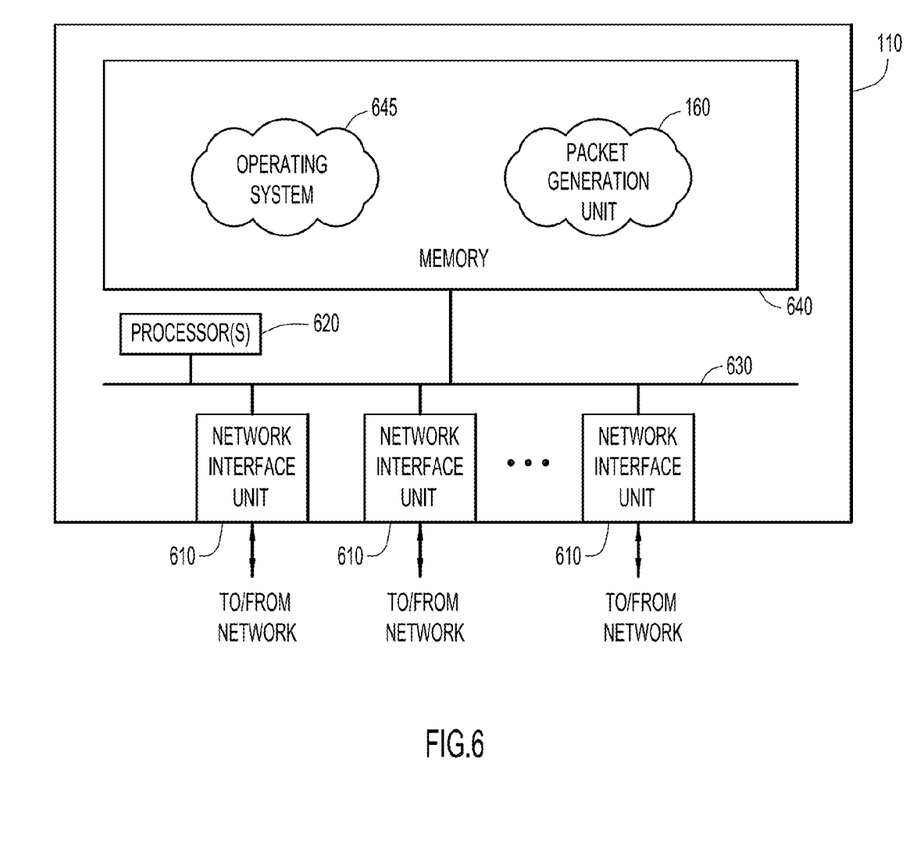
FIG. 6 is a block diagram of a device configured to perform generation and programming of a dynamically programmed network packet.

Turning now to FIG. 6, depicted therein is an example block diagram of a network device, e.g., sending device 110, configured to perform the techniques described herein in connection with FIGS. 1-5. The packet sending device 110 comprises one or more network interface units 610 (e.g., network interface cards) to enable communication over a network, processor(s) 620, bus 630, and memory 640. The memory 640 contains software instructions for operating system 645 and packet generation unit 160.

Memory 640 may comprise read only memory (ROM), random access memory (RAM), magnetic disk storage media devices, optical storage media devices, flash memory devices, electrical, optical, or other physical/tangible (e.g., non-transitory) memory storage devices. The processor 620 is, for example, a microprocessor or microcontroller that executes instructions for the packet generation unit 160. Thus, in general, the memory 640 may comprise one or more tangible (non-transitory) computer readable storage media (e.g., a memory device) encoded with software comprising computer executable instructions and when the software is executed (by the processor 620), and in particular packet generation unit 160, it is operable to perform the operations described herein in connection with FIGS. 1-5. Specifically, packet generation unit includes instructions that allow processor 620 to generate packets that include dynamically programmed packet headers, including the example headers or FIGS. 2 and 3.

According to other examples, the logic of the packet generation unit 160 may be implemented in one or more ASICs in digital logic gates.

Figure 7:
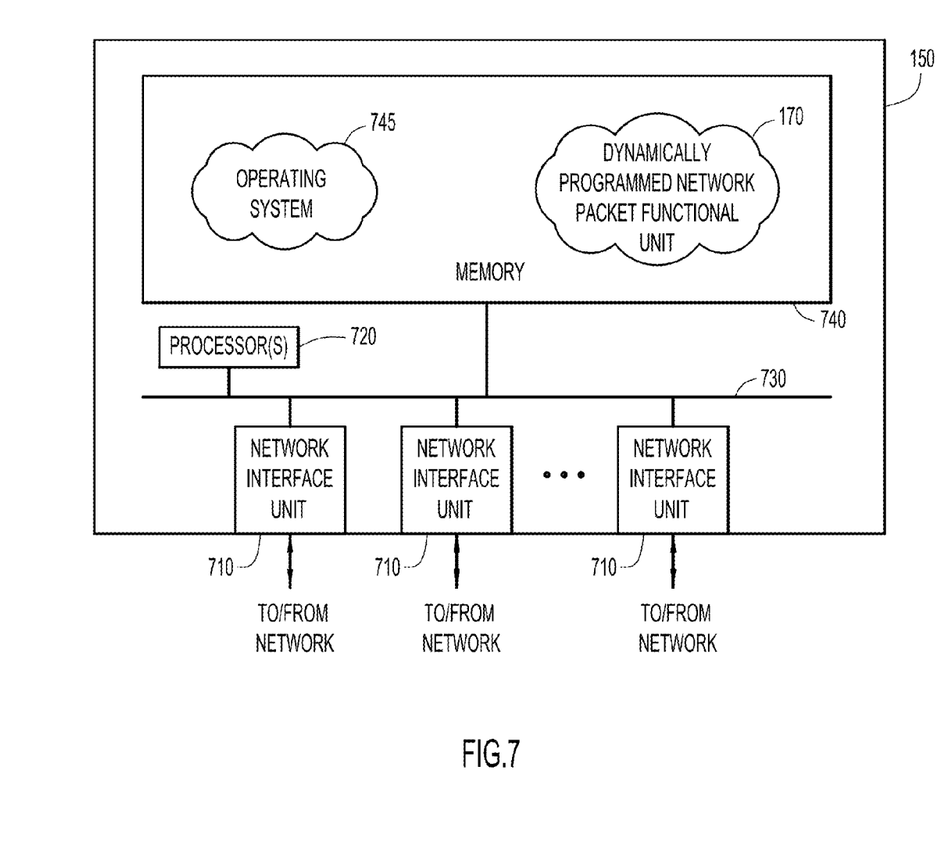
FIG. 7 is a block diagram of a device configured to process a dynamically programmed network packet.

With reference now made to FIG. 7, depicted therein is an example block diagram of a network device, e.g. network node 150, configured to process dynamically programmed network packets as described above in connection with FIGS. 1-5. The network node 150 comprises one or more network interface units 710 (e.g., network interface cards) to enable communication over a network, processor(s) 720, bus 730, and memory 740. The memory 740 contains software instructions for operating system 745 and dynamically programmed network packet functional unit 170.

Memory 740 may comprise ROM, RAM, magnetic disk storage media devices, optical storage media devices, flash memory devices, electrical, optical, or other physical/tangible (e.g., non-transitory) memory storage devices. The processor 720 is, for example, a microprocessor or microcontroller that executes instructions dynamically programmed network packet functional unit 170. Thus, in general, the memory 740 may comprise one or more tangible (non-transitory) computer readable storage media (e.g., a memory device) encoded with software comprising computer executable instructions and when the software is executed (by the processor 720), and in particular dynamically programmed network packet functional unit 170, it is operable to perform the operations described herein in connection with FIGS. 1-5. Specifically, dynamically programmed network packet functional unit 170 includes instructions that allow processor 720 to perform the functions indicated in the instruction portion of a dynamically programmed packet header, including the example headers or FIGS. 2 and 3.

According to other examples, the logic of functional unit 170 may be implemented in one or more ASICs in digital logic gates.

The techniques described above in reference to FIGS. 1-5, and the devices described with reference to FIGS. 6 and 7 may also allow vendors to distribute software modules for packet processing, instead of, or in addition to, large monolithic network operating systems. Because packets can both determine their path through a network, and be programmed to initiate specific functions at specific nodes, individual networks nodes can be customized to perform specific functions. For example, specific nodes may be configured to perform specific features or modes of packet processing, such as authentication/security mechanisms, filtering/firewall functions, load-balancing algorithms, statistics collectors, and so on. Accordingly, highly sophisticated processing programs may be imposed on a per-packet basis, and it may be further possible to design and deploy new features "on the fly" by adding support for new modules or combining existing modules in new ways merely by changing the set of instructions imposed on a packet.

Dynamic packet processing also allows for the "virtualization" of network appliances. In traditional networks, a wide variety of specialized appliances are deployed and managed to provide different traffic-processing services such as routing, firewalling, load-balancing, and statistics collection. The proliferation of such devices makes networks complex, failure-prone, and costly to manage. However, by utilizing dynamically programmed network packet processing, these different specialized functions can be turned into modules with a well-defined external interface (instruction set), abstracting the roles of these specialized appliances. The "program" describing how a packet is processed at different points as it transits the network is encoded in the instruction portion of the packet header itself. This means, for example, that a whole sub-domain of firewalls and load-balancers could be replaced by a single server cluster that advertises support for the relevant packet-processing instructions. In other words, because the packet header includes the instructions for which functions should be performed on the packet, a general purpose device can determine the appropriate function to be performed on the packet based on the instructions.

Additionally, when multipurpose network devices are utilized, possibly embodied in a server or cluster of servers, the forwarding instructions may comprise forwarding instructions for a virtual network. Similarly, the instructions that perform services on the packet (e.g. encryption, deep inspection, deletion, etc.) may include identification of the appropriate functional unit of the multipurpose device configured to carry out the instruction.

Furthermore, a group of specialized appliances may be "encapsulated" as a black box that presents a common interface to the rest of the network via the set of programs/instructions it advertises, so that other network devices do not and need not know whether the implementation of the functions they use is done by a group of specialized hardware appliances, or instead by a single general-purpose compute-server cluster.

While dynamic packet processing as described herein is highly flexible, powerful, and general, it does not come without significant implications for network security, as packets shift from being passive data-objects to active elements that contain programs that specify how they are processed. Accordingly, necessary technological countermeasures may be employed. For example, devices can refuse to run programs that are not cryptographically signed by a trusted source, and network operators can place tight controls over the instructions and programs that packets from different sources are permitted to execute. Furthermore, dynamic packet processing as described herein allows for much more sophisticated security mechanisms to be designed than those that exist with static packet protocols. For example, instructions can be transparently added by authorized devices to packets in transit that cause the packets to be traced or mirrored to an intercept point.

Additional benefits of dynamic packet processing include seamless "chain routing" methods for packet path determination and encoding, greater control over how packets flow through and are processed by their networks. Additionally, the techniques described herein enable a flexible and modular approach to packet processing where any desired path and series of processing instructions can be imposed on each packet at network ingress instead of relying on the logic embedded in "one size fits all" monolithic operating systems.

Furthermore, dynamic packet processing as described herein allows for specialized network appliances, or whole network sub-domains, to be given a common interface in the form of a high-level instruction set, and then "virtualized," thereby, making it possible to provide the same set of functionality using different internal implementations. Additionally, packet processing operations can be offloaded from a dedicated packet processor to other devices within the network. Finally, the techniques described herein greatly facilitate Operations, Administration, and Maintenance (OAM) and packet instrumentation applications. OAM or instrumentation functions, such as techniques for packet loss and delay measurement, protection switching, path tracing, statistics collection, and remote mirroring can be achieved by adding appropriate instructions to the programs imposed on target packets.

The above description is intended by way of example only.

What is claimed is:
1. A method comprising:
   determining, at a network device, one or more functions to be performed at one or more network nodes along a network path;
   generating a packet including a header, the header comprising an instruction pointer, an instruction portion, a scratch portion and a read pointer; and
   transmitting the packet along the network path from the network device,
   wherein generating the packet comprises:
      writing to the instruction portion a first instruction for the one or more functions to be performed at the one or more network nodes;
      writing to the instruction pointer a value pointing to a location in the instruction portion containing the first instruction,
      writing to the scratch portion data to be used by the one or more functions, and
      writing to the read pointer a read pointer value pointing to a location in the scratch portion containing the data to be used by the one or more functions.
2. The method of claim 1, wherein:
   writing to the instruction portion further comprises writing a second instruction to a second location in the instruction portion; and writing the first instruction comprises instructions to set the instruction pointer to point to the second location containing the second instruction.

3. The method of claim 1, wherein:
writing the instruction portion comprises writing an instruction that the packet should be sent to a predetermined network node;
writing to the scratch portion comprises writing an indication of the network node port connected to the predetermined network node; and
writing the read pointer comprises writing a value pointing to the location in the scratch portion storing the indication of the network node port connected to the predetermined network node.

4. The method of claim 1, wherein:
determining one or more functions comprises determining that a packet payload will be encrypted at a predetermined node;
writing instructions for the one or more functions comprises writing instructions instructing the predetermined node to encrypt the packet payload;
writing to the scratch portion comprises writing a key configured to be used to encrypt the packet payload; and
writing the read pointer comprises writing a read pointer value pointing to the key.

5. The method of claim 1, wherein generating the packet comprises:
generating a write pointer, and
writing a write pointer value to the write pointer pointing to a location of the scratch portion at which to store an output value generated by the one or more functions.

6. The method of claim 5, wherein:
writing to the instruction portion comprises writing an instruction to add a timestamp to the scratch portion; and
writing the write pointer value comprises writing a value pointing to a location of the scratch portion to store the timestamp.

7. The method of claim 1, further comprising receiving an advertisement of functions provided by the one or more network nodes; and
wherein determining the one or more functions comprises selecting functions from the advertisement.

8. The method of claim 1, wherein:
determining one or more functions comprises defining the network path through the network; and
writing instructions for the one or more functions comprises writing instructions controlling the path of the packet through the network.

9. The method of claim 1, wherein writing to the instruction portion the first instruction comprises writing a set of compute operations executable on a general purpose computing machine.

10. A method comprising:
receiving, at a network node, a packet comprising a header including an instruction portion, an instruction pointer, a scratch portion and a read pointer, wherein the instruction pointer points to a location in the instruction portion and the read pointer points to a location in the scratch portion;
reading the instruction pointer;
determining a first instruction located in the location in the instruction portion from the instruction pointer; and
executing the first instruction, wherein executing the instructions comprises reading data from the location in the scratch portion pointed to by the read pointer in response the first instruction.

11. The method of claim 10, wherein executing the first instruction comprises performing at least one of a deep inspection of a packet payload, a modification of a packet payload, or a deletion of the packet.

12. The method of claim 10, wherein:
executing the first instruction comprises encrypting a packet payload using a key in the location of the scratch portion pointed to by the read pointer and incrementing the instruction pointer.

13. The method of claim 10, wherein:
executing the first instruction comprises incrementing the instruction pointer, incrementing the read pointer and forwarding the packet to a subsequent network node indicated by a value in the location of the scratch portion previously pointed to by the read pointer.

14. The method of claim 10, wherein:
receiving the packet comprises a write pointer; and
executing the first instruction comprises writing a value to a location in the scratch portion pointed to by the write pointer.

15. An apparatus comprising:
a network interface unit configured to enable network communications;
a memory; and
a processor coupled to the network interface unit and the memory, wherein the processor is configured to:
receive a packet comprising a header including an instruction portion, an instruction pointer, a scratch portion and a read pointer, wherein the instruction pointer points to a location in the instruction portion and the read pointer points to a location in the scratch portion;
read the instruction pointer;
determine a first instruction located at the location in the instruction portion from the instruction pointer; and
execute the first instruction, wherein executing the instructions comprises reading data from the location in the scratch portion pointed to by the read pointer in response the first instruction.

16. The apparatus of claim 15, wherein the processor is further configured to:
increment the instruction pointer to point to a second instruction located at a second location in the instruction portion; and
execute the second instruction.

17. The apparatus of claim 15, wherein the processor is further configured to:
execute the first instruction using a value from the location in the scratch portion pointed to by the read pointer as an input to a function indicated by the first instruction.

18. A tangible, non-transitory computer readable medium comprising instructions that when executed by a processor cause the processor to:
receive a packet comprising a header including an instruction portion, an instruction pointer, a scratch portion and a read pointer wherein the instruction pointer points to a location in the instruction portion and the read pointer points to a location in the scratch portion;
read the instruction pointer;
determine a first instruction located in the location in the instruction portion from the instruction pointer; and
execute the first instruction, wherein executing the instructions comprises reading data from the location in the scratch portion pointed to by the read pointer in response the first instruction.

19. The computer readable medium of claim 18, wherein the instructions further cause the processor to:
increment the instruction pointer to point to a second location in the instruction portion containing a second instruction; and
execute the second instruction.

20. The computer readable medium of claim 18, wherein the instructions further cause the processor to:
execute the first instruction using a value from the location in the scratch portion pointed to by the read pointer as an input to the a function indicated by the first instruction.

21. The apparatus of claim 15, wherein the processor is further configured to:
receive a write pointer in the header; and
execute the first instruction by writing a value to a location in the scratch portion pointed to by the write pointer.

* * * * *